(12) United States Patent
Maltby (10) Patent No.: US 8,689,661 B2
(45) Date of Patent: Apr. 8, 2014

(54) VARIABLE RADIUS LEVER ARM ASSEMBLY

(76) Inventor: Malory Maltby, Ardin (FR)

(*) Notice: Subject to any disclaimer, the term of this patent is extended or adjusted under 35 U.S.C. 154(b) by 570 days.

(21) Appl. No.: 12/773,703

(22) Filed: May 4, 2010

(65) Prior Publication Data

US 2010/0275722 A1 Nov. 4, 2010

(51) Int. Cl.
*G05G 1/06* (2006.01)

(52) U.S. Cl.
USPC ............................................ 74/522; 81/177.6

(58) Field of Classification Search
USPC ........... 74/519, 522–525, 546, 547; 81/177.2, 81/177.6, 177.7; 16/429
IPC ............................................. B25B 13/48,13/52
See application file for complete search history.

(56) References Cited

U.S. PATENT DOCUMENTS

| | | | | |
|---|---|---|---|---|
| 1,080,121 A * | 12/1913 | Oriol | ............................. | 81/177.8 |
| 1,100,097 A * | 6/1914 | Reed | ............................... | 464/151 |
| 1,316,398 A * | 9/1919 | Steininger | ........................ | 81/119 |
| 1,903,660 A * | 4/1933 | Smith et al. | ................... | 81/57.43 |
| 2,577,157 A * | 12/1951 | Ross | ............................... | 81/177.6 |
| 3,399,584 A * | 9/1968 | Lewicki | ......................... | 81/177.6 |
| 4,582,298 A | 4/1986 | Boome et al. | ................. | 254/266 |
| 4,606,247 A | 8/1986 | Graham | ........................ | 81/177.6 |
| 4,672,805 A | 6/1987 | Moritz | ............................ | 59/78.1 |
| 5,305,668 A * | 4/1994 | Davis | ............................ | 81/177.7 |
| 5,517,884 A * | 5/1996 | Sanders | ............................. | 81/60 |
| 5,572,913 A * | 11/1996 | Nasiell | .......................... | 81/177.6 |
| 6,412,374 B1 | 7/2002 | Hsieh | ........................... | 81/177.7 |
| 6,952,986 B2 * | 10/2005 | Fu | .................................. | 81/177.6 |
| 7,343,837 B1 * | 3/2008 | Domanico et al. | ........... | 81/177.7 |
| 7,343,847 B2 | 3/2008 | Scheckelhoff et al. | .......... | 92/63 |
| 2006/0196303 A1 | 9/2006 | Lowe et al. | .................... | 74/543 |

FOREIGN PATENT DOCUMENTS

DE        1 555 819        10/1969

* cited by examiner

*Primary Examiner* — Thomas Diaz
(74) *Attorney, Agent, or Firm* — Hayes Soloway P.C.

(57) ABSTRACT

A curled variable radius lever comprises a lever arm 2 of variable effective length that curls and uncurls about a drive axis. In a preferred arrangement the lever assembly has a plurality of rigid blocks 3 articulated together by a chain 4 with link pivots 5 which are affixed to respective blocks 3. Each block 3 has a pair of facing walls 11 and a pair of facing mutually inclined sloping walls 12 which abut when the lever arm 2 is in a curled condition. The lever arm 2 is pulled into the curled condition by a coiled tension spring 13 and restrained in this position by a magnet 9. When it is uncurled the walls 11 abut. The chain 4 then prevents the arm 2 from bending further when a driving force is applied by users to a handle 6. The lever may be used with socket sets, yacht winch, fishing rod reel, a bicycle crank or a jack assembly.

20 Claims, 9 Drawing Sheets

VARIABLE RADIUS LEVER ARM ASSEMBLY

FIELD OF THE INVENTION

This invention relates to a lever arm assembly of variable radius. The unique features of the assembly make it suitable for a wide variety of uses including, inter alia, in a yacht winch, in a fishing rod reel, as a lever for a socket set, in a bicycle crank assembly, in a jack assembly, in a torque wrench and as part of a wheel valve assembly.

BACKGROUND TO THE INVENTION

There are circumstances in which it would be desirable to be able to alter the effective length of a manually operable lever arm. Two constructions for adjusting the length of a lever arm are shown in U.S. Pat. No. 4,582,298 and in US patent application US20060196303A1. U.S. Pat. No. 4,582,298 discloses a yacht winch assembly in which the winch crank arms are telescopic to permit the arms to be increased in length by releasing a spring-biased catch which is capable of holding the arm in either a short or long condition. The user chooses whether to increase the winch arm length or to reduce it. US 20060196303A1 discloses a handle of adjustable length for operating a screw jack, the handle having a slidable connection with the rotatable drive of the jack. The effective length of the handle can be manually adjusted.

Others have sought to create articulated handles on spanners, wrenches and the like to collapse for ease of storage or to bend to allow access of the tool to awkward to reach areas, such as to reach pipe couplings behind sink units et cetera. Examples include U.S. Pat. No. 4,672,805, U.S. Pat. No. 4,606,247, U.S. Pat. No. 6,412,374 and U.S. Pat. No. 7,343,847. A car door window handle of similar design is shown in DE 1555819 and articulates to flex out of harm's way in a crash. All of the afore-mentioned devices have the handle lever lying in use in a plane orthogonal to the rotating axis of the item to be rotated by the tool and are designed for the lever handle to curl or bend away from that plane not to curl in that plane. In each case when the lever handle is curled it does not curl around the rotating axis/drive axis of the tool. These devices do not provide for any substantial adjustment of the length of the lever handle for adjusting leverage.

The inventive lever arm assembly of variable radius of the present invention stems in part from some work aimed at providing a lever arm assembly in which spring biasing is used to assist in adjusting the effective length of the lever arm. However, the invention also encompasses some advantageous constructions that do not necessarily employ spring-biasing. The present invention seeks to overcome the limitations of existing lever arm devices to provide for substantial adjustment in leverage for a range of different uses.

SUMMARY OF THE INVENTION

According to a first aspect of the invention there is provided a lever arm assembly comprising a segmented lever arm able to curl and having a proximal end and a distal end, the lever arm carrying a drive connection at the proximal end for turning a driven member the drive connection having a drive axis that is substantially perpendicular to the plane in which the lever arm curls, the lever arm being capable of being brought from a curled first condition wherein the lever arm is curled around the drive axis and the distal end is relatively close to the axis of the drive lug to provide a relatively short lever for turning the driven member and a relatively uncurled second condition in which the proximal end and the distal end are spaced further apart, to provide a relatively long lever for turning the driven member. Thus, in the first condition the lever arm has a relatively short length, but in the second condition the lever arm has a relatively long length.

To greatly enhance turning operation for various different applications, preferably the distal end of the lever arm has a manually operable drive lug and wherein the drive lug is substantially perpendicular to the plane in which the arm curls.

The lever arm segments can take various forms. The lever arm may comprise a plurality of blocks that engage with one another at least when the lever arm is in said second condition, the blocks being articulated to one another by a flexible connector. The abutment of the blocks in the extended second condition can rigidify the extended lever arm, by providing limiting stops to further resist deflection of the lever arm. The flexible connector may be a chain, and the blocks are preferably then shaped to engage with one another both in said first condition and in said second condition.

Each block may be provided with a pair of substantially parallel oppositely facing walls that engage with corresponding walls of a respectively adjacent block in said second condition, and a pair of oppositely inclined sloping walls that engage with corresponding sloping walls of the respectively adjacent blocks in said first condition.

Instead of employing an independent flexible connector, the blocks may be provided with integral pivotal connections one to another. In one embodiment resilient means is provided to act on the blocks and urge the blocks relative to one another, to bias the lever arm towards said first condition. For some applications of the invention it is desirable to be able to quickly change the condition of the lever assembly from the first condition to the extended second condition. In a second embodiment resilient means is provided to act on the blocks and urge the blocks relative to one another, to bias the lever arm towards said second condition.

When the blocks have sloping faces the resilient means preferably comprises a plurality of coiled compression springs, the opposite ends of each of which are located in blind bores in the sloping walls of respectively adjacent blocks. Alternatively, a spring or springs under tension may be employed towards the inside radius of the device to assist the return of the arm to the first condition. In other constructions a resilient means acts on the blocks and urges the blocks relative to one another to bias the lever arm towards said first condition. This means that as the user applies sufficient force to the lever to counteract the resistance to turning of the driven member, it will progressively uncurl, generating more resilient force in the resilient means. It can be arranged that a progressive uncurling of the lever arm takes place by suitable choice of the spring-characteristics of the resilient means.

The function of the device may be further modified to measure the force exerted on the device in the extended mode such that a measurement of the torque on the drive connection axis may be shown to the operator. This may be achieved by the inclusion of a load cell typically between first and second blocks at said one end with a feed of the information gathered to a display within the device. Instead of employing a chain, in other embodiments the flexible connector is a resilient band to which the blocks are connected. The blocks may have complementary projections and recesses on their opposing ends that fit together when the arm reaches said second condition. Alternatively, at least some of the blocks may be provided with at least one knuckle that is slidably received between a pair of knuckles on the respectively adjacent block, the engaged knuckles limiting twisting of the band about the local central axis of the band yet permitting flexing of the band on curling and uncurling of the band. A releasable retaining means may be provided for holding the arm in said curled first condition, particularly when the arm is resiliently biased towards the second condition.

The retaining means is preferably arranged to release when subject to a predetermined load, to allow the arm to move from said first condition towards said second condition. The retaining means may be a clip, a magnetic means, or other mechanical means such as a loop and hook fastener such as VELCRO®.

A releasable strut means may be provided to retain the lever arm in said second condition, and the releasable strut means may comprise latches mounted on the respective blocks and cooperating with respectively adjacent blocks, and a common latch release means for disengaging all of the latches to enable the arm to move towards said first condition. The lever arm may be so configured as to describe substantially a complete circle when in said first condition. The lever arm may be provided with a drop-arm at one or both ends to displace the axis/axes of the drive lug and/or drive connection from the immediate end of the lever arm.

Preferably the axis of the drive connection and that of the drive lug are directed perpendicular to the plane in which the arm curls. Preferably the arm is substantially straight in said second condition.

When the lever arm assembly is for use with sockets of a mechanic's socket, the drive connection comprises a square-section lug for engaging with the sockets. The drive connection may then comprise oppositely directed square-section lugs to enable the arm assembly to be reversed when used to tighten and un-tighten a nut engaged by a socket. In conditions in which a substantial force is required from the operator, two such lever arms on opposite sides of the device may be incorporated within one device such that both the left and right arms of the operator may simultaneously apply a force. This configuration might be used to tighten or release a large stopcock or to turn an auger used for the obtaining of soil samples.

The lever arm assembly may be used in a yacht winch, the drive connection being connected to a capstan or winch, and the drive lug mounting a rotatable handle. In this application of the invention the resilient means would preferably be arranged to bias the handle towards said first condition.

A fishing rod reel assembly desirably incorporates a lever assembly as set forth, in which the lever assembly may be biased towards the second condition, and is preferably normally held in the first condition by a retaining means.

A bicycle crank assembly may incorporate a lever arm assembly in accordance with the invention, the drive lug constituting the spindle of a pedal, and the drive connection being adapted to connect with a bottom bracket spindle. The resilient means would in this case be arranged to bias the arms of the crank assembly towards the first condition.

The lever arm assembly may also be assembled as a wheel valve, gate valve or other wheel driven apparatus, suitably wheel driven apparatus that has a rotary wheel to move an element with high static friction, the wheel incorporating the lever arm assembly built into the circumference thereof. For fire hydrant wheel valves or other water or fuel flow control valves that need to be opened or shut in emergency situations this can avoid need to find a crow bar to lever open the wheel valve and can be a life-saver.

In any of the embodiments the assembly may further have a load cell between two adjacent segments blocks of the lever arm, the load cell being arranged to sense the force of pressing together of the two adjacent segments/blocks as the lever is applied in use. The apparatus can thus serve as a torque wrench. The load cell may be provided with a processor and display on the lever arm to provide a local read-out of the torque at the lever arm though this is not ideal for ease of reading since the lever arm is being turned in use. Instead preferably the lever arm assembly may have means to link, suitably wirelessly, to a remote processor and display such as a desk-top or laptop computer or Smartphone or other device to provide the read-out in a more easily read manner.

BRIEF DESCRIPTION OF THE DRAWINGS

Some lever arm assemblies in accordance with the invention will now be described, by way of example only, with reference to the accompanying schematic drawings in which.

DESCRIPTION OF THE PREFERRED EMBODIMENT

Figure 1:
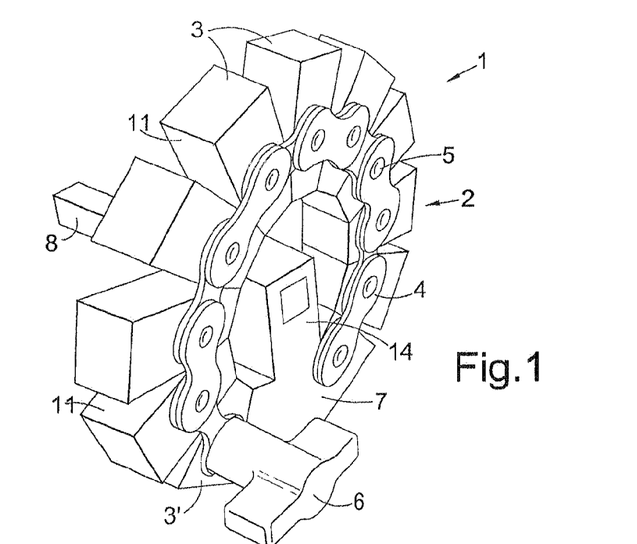
FIGS. 1 and 2 are perspective views of a hand-operated lever arm assembly comprising abutment blocks articulated by chain links, and shown with the lever arm in a curled condition in FIG. 1, and in a fully extended, uncurled condition in FIG. 2, the lever arm being spring-biased towards the closed condition by a coil spring or springs under tension.
Figure 2:
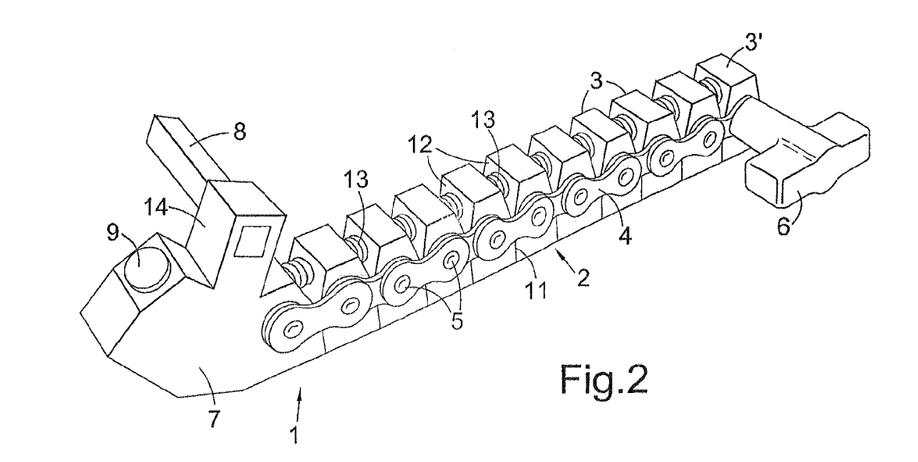

The lever arm assembly 1 of FIGS. 1 and 2 comprises a lever arm 2 of variable effective length having a proximal end to connect to a driven member to be turned and a distal end having a handle for turning the lever arm 2. The lever arm 2 comprises a plurality of rigid blocks 3 articulated together by a chain 4, the link pivots 5 of which are affixed to the respective blocks 3. The end block 3' at the distal end of the arm fixedly carries a drive lug in the form of a swivelling, pivotally mounted, handle 6 of T-shape that can be gripped by the fingers of the user so as to apply a turning force to the lever arm 2 and which swivels on the block 3' as the lever arm 2 is turned. Handles of other shapes may be employed. Fixed (non-swivelling) handles may be employed for some embodiments but are generally less comfortable to use and are less efficient.

The opposite, proximal, end of the chain 4 is connected to a drive block 7 which carries a square drive spindle 8 used in this embodiment for connection to sockets of a mechanic's socket set. It will be seen that the principal axis of the drive handle 6, that of the stem of the T-shape, is parallel to the axis of the drive spindle 8.

FIG. 1 shows the lever arm assembly 1 in a curled condition in which the end block 3' has been brought to abut with a magnet 9 fast with the drive block 7, and the arm 2 has been brought into a substantial circle, as permitted by the chain articulation. Each of the blocks 3, 3' has a pair of oppositely facing parallel walls 11, and a pair of oppositely facing mutually inclined sloping walls 12, such that the blocks 3, 3', as viewed in the axial direction of spindle 8, the direction perpendicular to the plane in which the arm curls, have the outline of a house with a steeply pitched roof.

A coiled tension spring 13 is located by holes in the blocks 3, opposite ends of the spring being restrained by fixings (not shown) located in drive block 7 and in the end block 3 which also includes the handle 6. Thus the device is urging the blocks to the condition of FIG. 1. The abutment of the block faces 11, and the constraint provided by the chain, prevent the arm 2 from bending further (clockwise in FIG. 2) from the straight condition shown when driving force is applied by the users fingers to the handle 6.

The strength of the magnet 9 is, of course, chosen to be sufficient to retain the blocks, as in FIG. 1, with the sloping faces 12 of adjacent blocks in abutment to define the shape of the arm in the curled condition. This enables the user to quickly spin a nut engaged by a socket fitted to the drive spindle until the nut begins to encounter sufficient resistance for the force of magnet 9 to be overcome, whereupon the handle may be uncurled to the extended condition of FIG. 2. The user then has the advantage of a longer lever with which to apply a greater torque to the nut being tightened. The drive block 7 incorporates a drop arm portion 14 to displace the axis of spindle 8 from the immediate end of the curled arm, so that the axis of spindle 8 is approximately at the centre of the circle described by the curled arm, as seen in FIG. 1.

Figure 3:
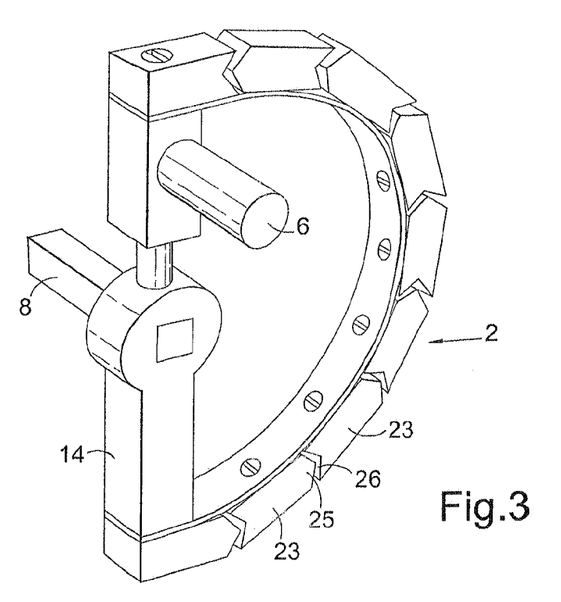
FIGS. 3 and 4 are perspective views of a further hand-operated lever arm assembly incorporating a composite strip spring which provides linking of the abutment blocks as well as resilient biasing of the arm towards the curled condition of FIG. 3 from the extended condition of FIG. 4, or away from the curled condition as shown in FIG. 4A.
Figure 4:
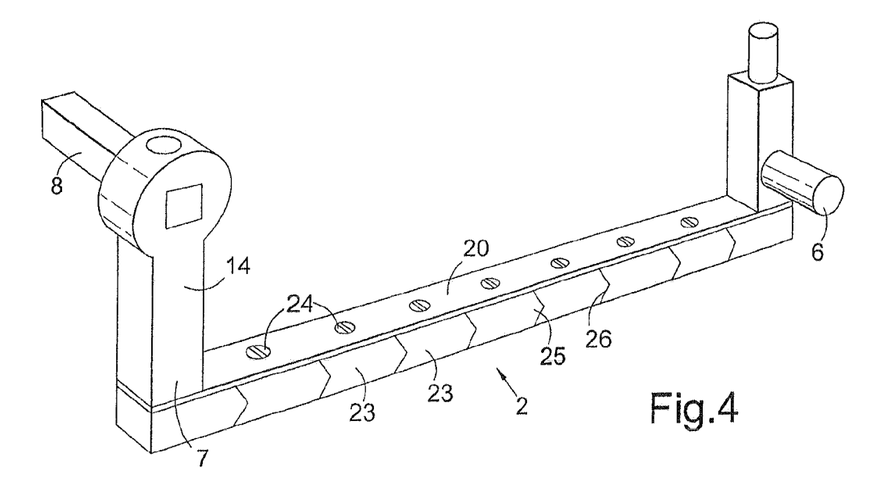
Figure 4A:
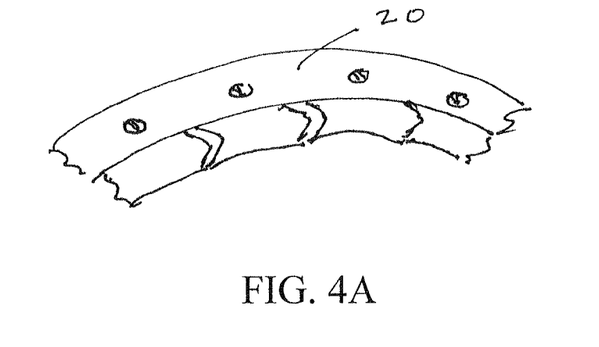

In the embodiment of FIGS. 3 and 4 corresponding reference numbers have been applied to parts corresponding to those of the construction of FIG. 1. In FIGS. 3 and 4 a spring 20 of strip shape is employed and is attached to blocks 23 by respective screws 24. The spring 20 may be a metal spring or a composite spring, such as an FRP spring. The spring may be arranged to be straight or curled in its relaxed condition, depending upon the spring-resistance required to curling and uncurling of the lever arm 2. The use of the flat spring 20 brings with it a tendency of the spring to twist on application of force to handle 6. To counteract this the opposite ends of the blocks 23 are provided with complementary projections 25 and recesses 26 of interlocking V-shape as viewed perpendicular to the plane in which the arm curls, in order to hold each block from twisting relative to the adjacent blocks about the axis of the extended lever arm. Alternatively, spring 20 may be configured for resilient biasing of the arm towards the uncurled condition, i.e. as shown in FIG. 4A.

Figure 5:
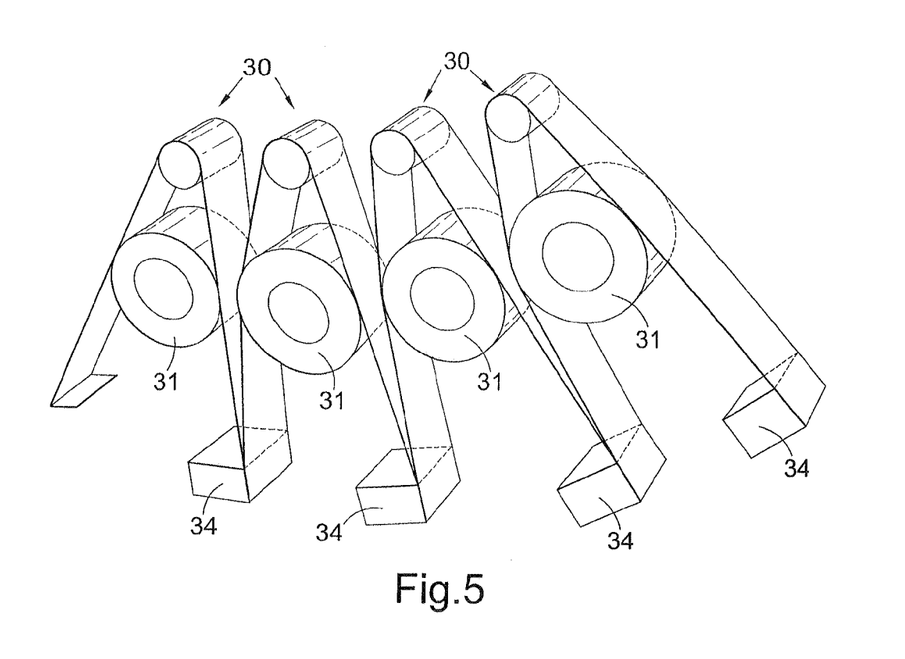
FIG. 5 is a schematic perspective view of an assemblage of a further lever arm assembly in accordance with the invention.
Figure 6:
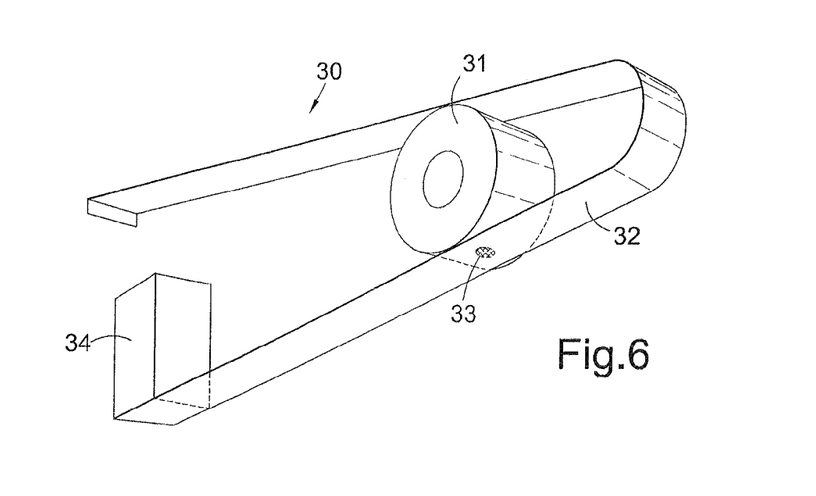
FIG. 6 is a schematic perspective view of one leaf-spring and block unit of the assemblage of FIG. 5 for mounting on a chain.
Figure 7:
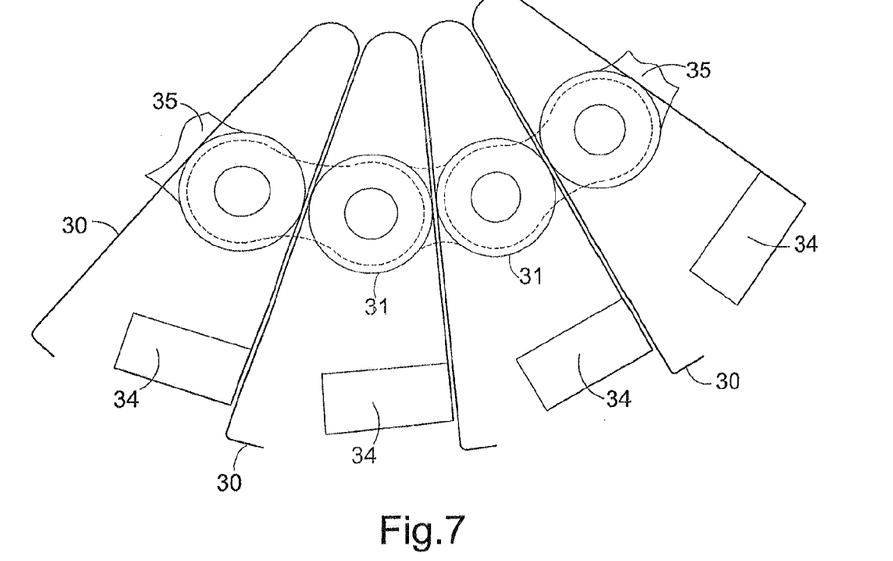
FIG. 7 is a view showing how the assemblage of FIG. 5 is secured to a chain to provide a segmented lever arm in accordance with the invention.

FIGS. 5, 6 and 7 show a modification of the lever arm assembly of FIGS. 1 and 2, in which the blocks 3 and spring 13 have been replaced by a series of leaf-spring and block units 30, one of which is shown in FIG. 6. Each unit 30 comprises an annular hub 31 for connection to a chain link, and a V-shaped leaf-spring 32 spot-welded to the hub at 33. One arm of the V-shaped spring carries an abutment block 34 at the free end of the arm.

FIG. 5 shows show the units can be assembled together in abutment with one another prior to attaching a chain, as indicated in broken outline at 35 in FIG. 7. The leaf-springs 30 bias the lever arm to the curled condition shown in FIG. 7 in which the blocks 34 are well-spaced from one another. When force is applied to a handle, not shown, on the lever arm assembly of FIG. 7, the force of the leaf-springs 30 will be overcome to bring the blocks 34 close to one another to define the extended, uncurled condition of the assembly.

Figure 8:
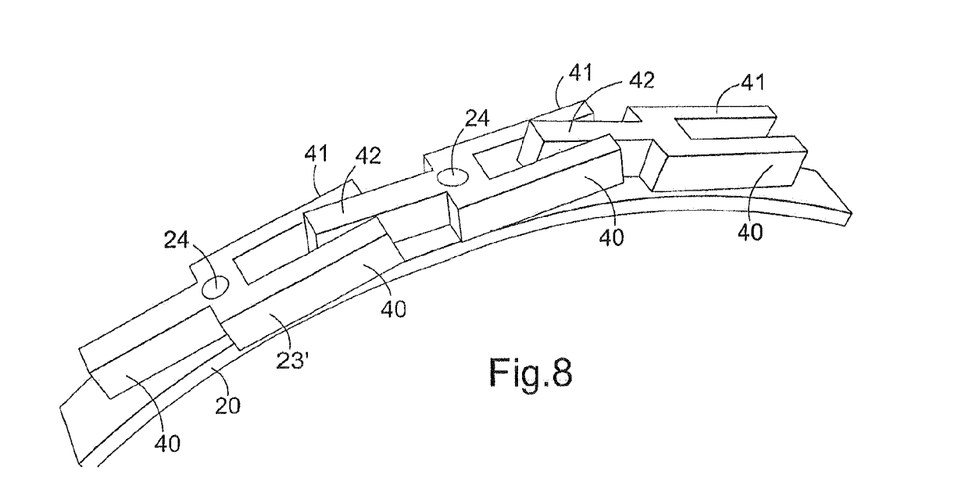
FIG. 8 is a perspective view of a modified block and band assembly of a lever arm in accordance with the invention.

FIG. 8 shows a modification to the block and band structure shown in FIGS. 3 and 4. In order to resist twisting of the band 20 about the local longitudinal axis of the band, the blocks 23' are each provided with knuckles 40, 41, 42, the knuckle 42 on one block being received slidably between the pair of knuckles 40, 41 on the respectively adjacent block. The knuckles are each of oblong-rectangular cross-section to resist local twisting of one block relative to the adjacent block, relative to the local axis of the band 20, yet permitting curling and uncurling of the band 20.

Figure 9:
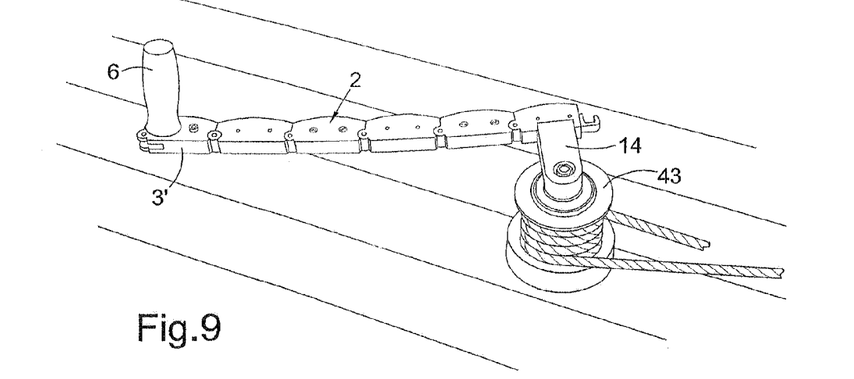
FIG. 9 is a perspective view of the hand-operated lever arm assembly assembled as a yacht winch.

Referring to FIG. 9, this shows the extended state of the lever arm assembly assembled as a yacht winch on the deck of a yacht in which the drive connection on the drop arm 14 is connected to a capstan 43. The drive lug at the distal end block 3' of the lever arm 2 again comprises a swivelling handle 6 mounted to the distal end block 3' by a spindle/pivot pin for ease of turning the winch.

Figure 10:
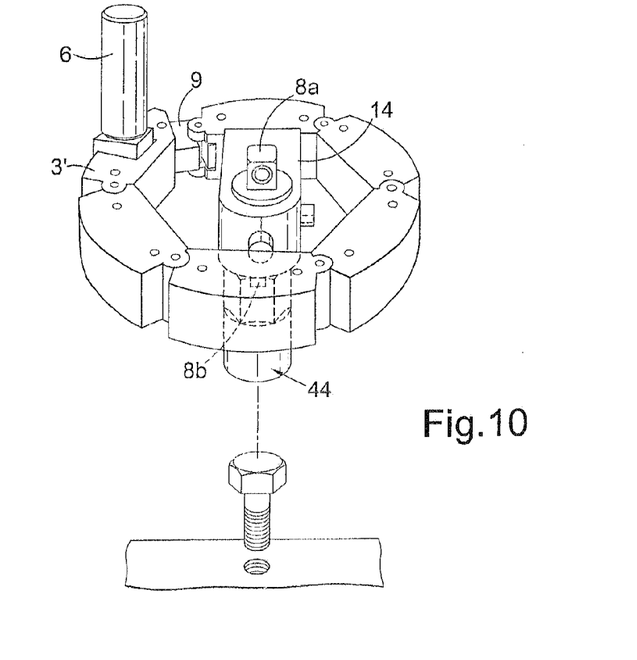
FIG. 10 is an in use perspective view of the hand-operated lever arm assembly for use with a socket set.

FIG. 10 shows an in-use view of the curled state of the previously discussed lever arm assembly adapted for engaging with sockets of a mechanic's socket set or any other tools or devices requiring a turning force. The drop arm 14 at the drive connection has the oppositely directed square-section lugs 8a, 8b on the top and bottom faces for engaging with the sockets of a mechanic's socket set. The oppositely directed square-section lugs 8a, 8b enable the arm assembly to be reversed when used to tighten and un-tighten a nut or bolt head engaged by a socket. As illustrated here the lower lug 8b is shown with a socket 44 fitted to it. A rotatable handle 6 is again provided as the drive lug on the distal end block 3' for ease of turning and the lever arm 2 is held in the curled state by magnet 9 on the distal end block 3' until it is desired to uncurl the lever arm 2 and use it in the extended state.

Figure 11:
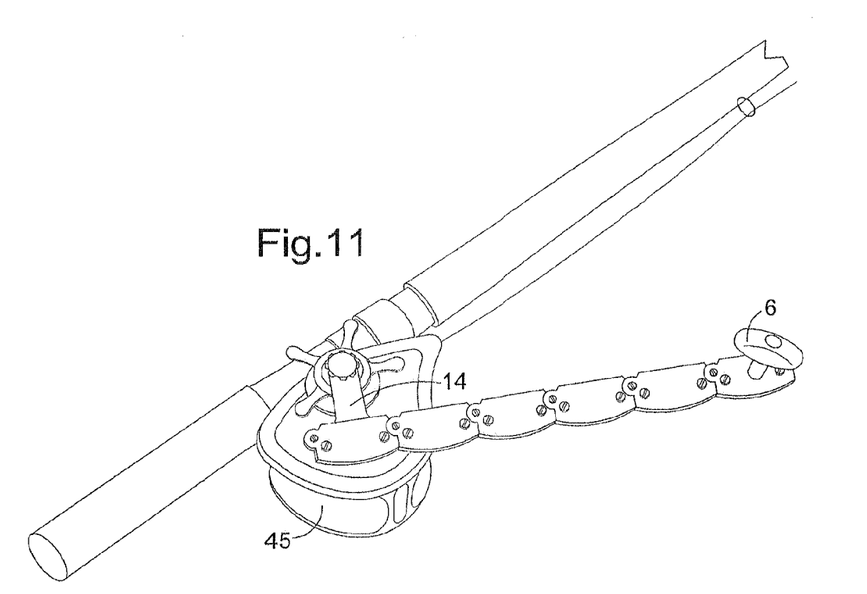
FIG. 11 is a perspective view of the hand-operated lever arm assembly assembled as a fishing rod reel assembly.

Referring to FIG. 11, this shows the lever arm assembly assembled as a fishing rod reel assembly, the drive connection on the drop arm 14 being connected to or integral with the spindle of the reel 45. Again the drive lug on the distal end block 3' has a rotatable handle 6 for ease of turning the reel 45.

Figure 12:
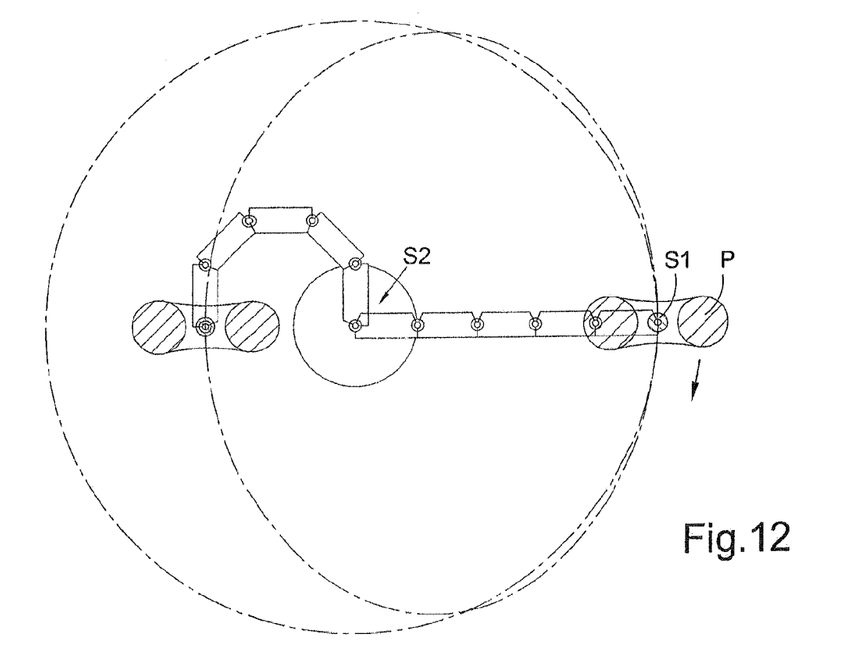
FIG. 12 is a schematic elevation view of the lever arm assembly assembled as a bicycle crank assembly.

FIG. 12 shows the lever arm assembly assembled as a bicycle crank assembly, with the drive lug constituting the spindle $S_1$ of a pedal P, and the drive connection being adapted to connect with a bottom bracket spindle S2 of the bicycle. The pedal P could be configured and allowed to follow a generally elliptical path, as shown, reducing its travel on the upstroke.

Figure 13:
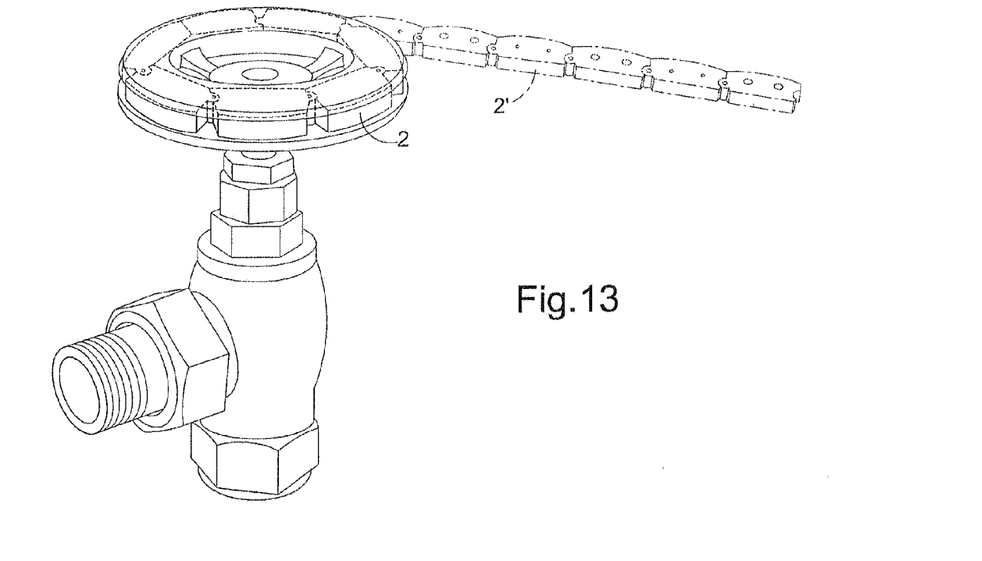
FIG. 13 is a perspective view of the hand-operated lever arm assembly assembled as a wheel valve assembly.
Figure 14:
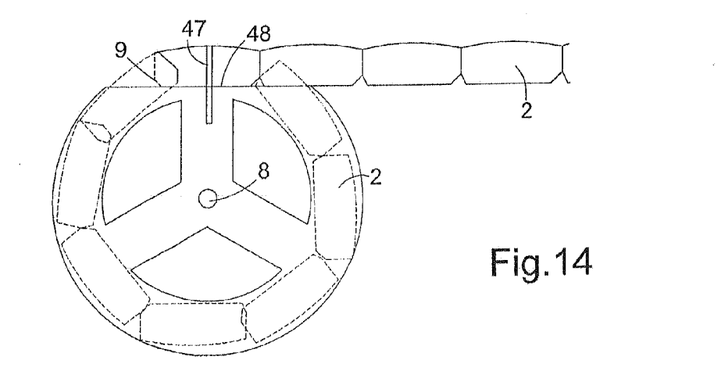
FIG. 14 is a schematic top plan view of the wheel valve assembly embodiment.

Referring to FIGS. 13 and 14, these show the lever arm assembly assembled in a gate valve or wheel valve—for example of a fire hydrant or a fuel supply line flow control valve. The rotary drive wheel 46 of the wheel valve incorporates the lever arm assembly built into its circumference and enables the valve to be opened or shut using the lever arm 2 like a crow bar to lever open the wheel valve overcoming static friction from back-pressure and corrosion, detritus or other impediments from long periods of non-use.

In FIG. 13 the curled state of the lever arm 2 hidden in the wheel circumference is shown. The uncurled/extended state of the lever arm 2 for use as a crow bar is shown in dotted line 2' in FIG. 13 and in solid line in FIG. 14. A pivot pin/bolt 47 may be provided on a block close to the drive wheel 46 to allow the lever arm 2 to rotate through 180 degrees to allow for not only opening but also closure of the wheel valve using the same single lever arm 2. The wheel 46 may have a cut-out portion 48 at the region of the lever arm 2 attachment to the wheel 46 to allow the lever arm 2 to be extended and to be pivoted to the orientation for reversing the direction of turn of the wheel 46. In this embodiment the drive connection 8 comprises the drive shaft of the wheel 46. As with preceding embodiments a magnet 9 or other clip may be provided to retain the lever arm 2 in its curled condition.

Figure 15:
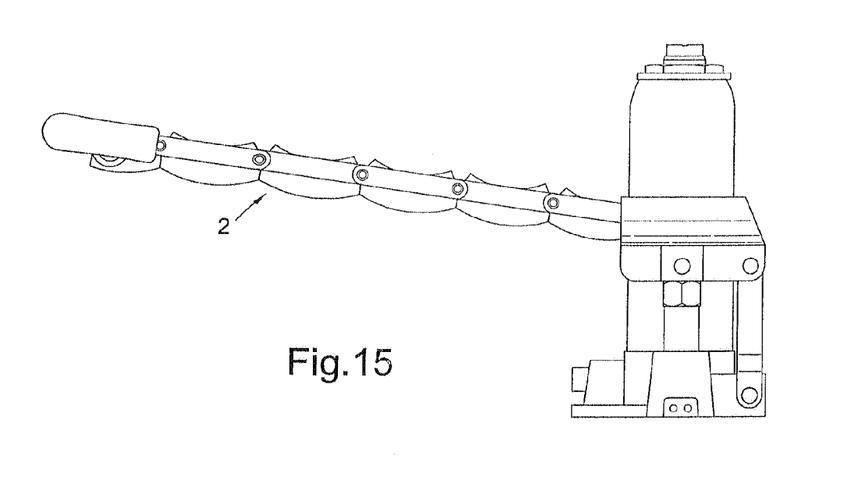
FIG. 15 is a perspective view of the hand-operated lever arm assembly assembled as a jack assembly in which a jack drive screw is driven by the lever arm assembly.

In FIG. 15 the lever arm assembly 1 is assembled as a jack assembly in which a jack drive screw is driven by the lever arm 2 as the arm 2 is repeatedly pushed down. The jack may be of various known types including ratchet, hydraulic or friction types.

Figure 16:
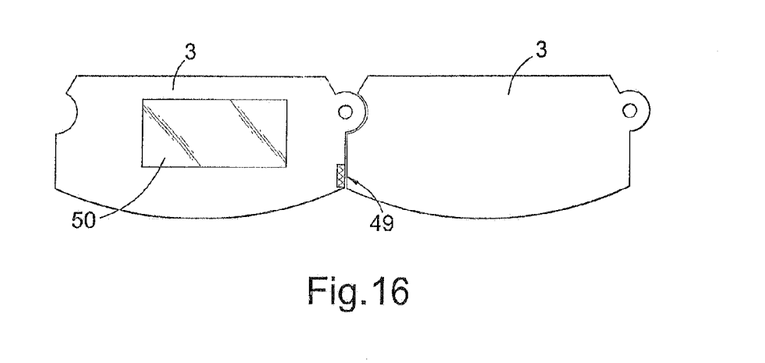
FIG. 16 is a detail elevation view of blocks of the lever arm of the lever arm assembly modified to incorporate a pressure sensor and a transmitter.

Referring to FIG. 16 this shows a detail elevation view of blocks of the lever arm 2 that are modified to incorporate a pressure sensor/load cell 49 and a wireless transmitter or an integrated processor and display 50. The load cell 49 is between two adjacent segments/blocks 3 of the lever arm 2, the load cell 49 being arranged to sense the force of pressing together of the two adjacent segments 3 as the lever 2 is applied in use. This is interpolated by the processor to provide a torque reading at the display 50 or by wireless transmission to a remote processor and display.

In various of the embodiments the lever arm assembly may be provided with a pair of lever arms extending from a common drive connection. These may be curled in the same direction to be able to increase the turning force applied. Alternatively they may be oriented in opposition to each other, that is to say with one to uncurl in one direction of rotation of the drive connection and the other to uncurl in the other direction of rotation of the drive connection to allow the lever arm assembly to be used to wind and unwind the driven item.

The invention claimed is:

1. A lever arm assembly comprising a segmented lever arm able to curl and having a proximal end and a distal end, the lever arm carrying a drive connection at the proximal end for turning a driven member, the drive connection having a drive axis that is substantially perpendicular to the plane in which the lever arm curls, the lever arm being capable of being brought from a curled first condition to an uncurled, straightened second condition wherein in the curled first condition the lever arm is curled around the drive axis and the distal end is closer to the drive axis than it is in the second condition to provide a lever for turning the driven member, and when the lever arm is in the uncurled second condition the proximal end and the distal end are spaced further apart, to provide a longer lever for turning the driven member, wherein the lever arm comprises a plurality of blocks linked and articulated to one another by a flexible chain connector, wherein the blocks are shaped to engage with one another in said first condition and in said second condition, wherein each block is provided with a pair of substantially parallel oppositely facing walls that engage with corresponding walls of a respectively adjacent block in said second condition, and a pair of oppositely inclined sloping walls that engage with corresponding sloping walls of the respectively adjacent blocks in said first condition, and wherein each linked pair of blocks having a wall of one block of the pair that opposes a wall of another block of the pair when the lever arm is in said second condition in use, limiting deflection of the lever arm and thereby rigidifying the straightened extended lever arm for use as a lever for turning the driven member.

2. A lever arm assembly as claimed in claim 1 in which the distal end of the lever arm has a manually operable drive lug and wherein the drive lug is substantially perpendicular to the plane in which the arm curls.

3. A lever arm assembly as claimed in claim 1 comprising resilient means acting on the blocks and urging the blocks relative to one another to bias the lever arm towards said second condition.

4. A lever arm assembly as claimed in claim 3 in which the resilient means comprises a plurality of coiled compression springs the opposite ends of each of which are located in blind bores in the sloping walls of respectively adjacent blocks.

5. A lever arm assembly comprising a segmented lever arm able to curl and having a proximal end and a distal end, the lever arm carrying a drive connection at the proximal end for turning a driven member, the drive connection having a drive axis that is substantially perpendicular to the plane in which the lever arm curls, the lever arm being capable of being brought from a curled first condition to an uncurled, straightened second condition wherein in the curled first condition the lever arm is curled around the drive axis and the distal end is closer to the drive axis than it is in the second condition to provide a lever for turning the driven member, and when the lever arm is in the uncurled second condition the proximal end and the distal end are spaced further apart, to provide a loner lever for turning the driven member wherein the lever arm corn rises a plurality of blocks linked and articulated to one another by a flexible chain connector, wherein the blocks are shaped to engage with one another both in said first condition and in said second condition, each linked pair of blocks having a wall of one block of the pair that opposes a wall of another block of the pair when the lever aim is in said second condition in use, limiting deflection of the lever arm and thereby rigidifying the straightened extended lever arm for use as a lever for turning the driven member, and further comprising a resilient means acting on the blocks and urging the blocks relative to one another to bias the lever arm towards said first condition.

6. A lever arm assembly as claimed in claim 1 comprising a releasable retaining means for holding the arm in said curled first condition.

7. A lever arm assembly as claimed in claim 6 in which the retaining means is arranged to release when subject to a predetermined load, to allow the arm to move from said first condition towards said second condition.

8. A lever arm assembly as claimed in claim 7 in which the retaining means is a clip.

9. A lever arm assembly as claimed in claim 1 comprising releasable strut means adapted to retain the lever arm in said second condition.

10. A lever arm assembly as claimed in claim 9 in which the releasable strut means comprises latches mounted on the respective blocks and cooperating with respectively adjacent blocks, and a common latch release means for disengaging all of the latches to enable the arm to move towards said first condition.

11. A lever arm assembly as claimed in claim 1 in which the arm forms substantially a complete circle when in said first condition.

12. A lever arm assembly as claimed in claim 1 in which the lever arm is substantially straight in said second condition.

13. A lever arm assembly as claimed in claim 1 in which the drive connection comprises a square-section lug for engaging with sockets of a mechanic's socket set or any other tools or devices requiring a turning force.

14. A lever arm assembly as claimed in claim 13 in which the drive connection comprises oppositely directed square-section lugs to enable the arm assembly to be reversed when used to tighten and un-tighten a nut engaged by a socket.

15. A lever arm assembly as claimed in claim 1 assembled as a yacht winch in which the drive connection is connected to a capstan.

16. A lever arm assembly as claimed in claim 1 assembled as a fishing rod reel assembly, the drive connection being connected to a reel.

17. A lever arm assembly as claimed in claim 1 assembled as a bicycle crank assembly, the drive lug constituting the spindle of a pedal, and the drive connection being adapted to connect with a bottom bracket spindle of a bicycle.

18. A lever arm assembly as claimed in claim 1 assembled as a jack assembly in which a jack drive screw is driven by the lever aim assembly.

19. A lever arm assembly as claimed in claim 1 assembled as a wheel valve, gate valve or other wheel driven apparatus having a drive wheel, the drive wheel incorporating the lever arm assembly built into the circumference thereof and the drive connection comprising a drive shaft at the centre of the drive wheel.

20. A lever arm assembly as claimed in claim 1, wherein the assembly further has a load cell between two adjacent segments of the lever arm, the load cell being arranged to sense the force of pressing together of the two adjacent segments as the lever is applied in use.

* * * * *

UNITED STATES PATENT AND TRADEMARK OFFICE
CERTIFICATE OF CORRECTION

| | | |
|---|---|---|
| PATENT NO. | : 8,689,661 B2 | Page 1 of 1 |
| APPLICATION NO. | : 12/773703 | |
| DATED | : April 8, 2014 | |
| INVENTOR(S) | : Maltby | |

It is certified that error appears in the above-identified patent and that said Letters Patent is hereby corrected as shown below:

In the Claims:

Claim 5, Col. 8, line 30, "loner" should be --longer--.

Claim 5, Col. 8, line 30, "member wherein" should be --member, wherein--.

Claim 5, Col. 8, line 31, "corn rises" should be --comprises--.

Signed and Sealed this
Nineteenth Day of August, 2014

Michelle K. Lee
*Deputy Director of the United States Patent and Trademark Office*